United States Patent
De Filippis et al.

(10) Patent No.: US 10,348,857 B2
(45) Date of Patent: Jul. 9, 2019

(54) DYNAMIC CREATION OF SUBSERVICES

(71) Applicant: Apple Inc., Cupertino, CA (US)

(72) Inventors: Pierre J. De Filippis, Sunnyvale, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 14/872,103

(22) Filed: Sep. 30, 2015

(65) Prior Publication Data

US 2016/0360005 A1 Dec. 8, 2016

Related U.S. Application Data

(60) Provisional application No. 62/171,953, filed on Jun. 5, 2015.

(51) Int. Cl.
*H04L 29/06* (2006.01)
*H04L 29/08* (2006.01)

(52) U.S. Cl.
CPC ............ *H04L 67/32* (2013.01); *H04L 65/403* (2013.01); *H04L 67/06* (2013.01); *H04L 67/1097* (2013.01)

(58) Field of Classification Search
CPC . H04L 67/32; H04L 67/1095; H04L 67/1097; H04L 65/403; H04L 67/06
USPC .................................................. 709/204, 248
See application file for complete search history.

(56) References Cited

U.S. PATENT DOCUMENTS

| | | | |
|---|---|---|---|
| 8,918,712 B2 | 12/2014 | Nario et al. | |
| 2006/0149751 A1* | 7/2006 | Jade | G06F 9/4443 |
| 2007/0157185 A1* | 7/2007 | Semerdzhiev | G06F 8/61 |
| | | | 717/148 |
| 2009/0144700 A1* | 6/2009 | Huff | G06F 9/44505 |
| | | | 717/121 |
| 2010/0106684 A1 | 4/2010 | Pizzo et al. | |
| 2012/0036450 A1 | 2/2012 | Canton | |

(Continued)

FOREIGN PATENT DOCUMENTS

EP 3059900 A1 * 8/2016 ......... H04L 41/5048

OTHER PUBLICATIONS

PCNEXUS, How to Setup Smart Connect for Sony Xperia M, Aug. 29, 2014, www.pcnexus.net, http://www.pcnexus.net/2014/08/how-to-setup-smart-connect-for-sony-xperia-m.html.*

*Primary Examiner* — David R Lazaro
*Assistant Examiner* — Zi Ye
(74) *Attorney, Agent, or Firm* — Kilpatrick Townsend & Stockton LLP (57) ABSTRACT

Methods and devices for enabling communication of a client application of a computing device with other devices are provided. The method includes obtaining, from a first client application on the computing device, one or more preferences for creating a first subservice for communicating with the other devices. A template service file associated with the first client application is identified and the template service file includes property definitions for creating subservices that communicate with the other devices. The template service file is used to create a first configuration file corresponding to the first client application, the a first configuration file including a plurality of the property definitions of the template service file. At least one of the plurality of the property definitions is modified using the one or more preferences. The first configuration file is stored in a memory of the computing device.

24 Claims, 7 Drawing Sheets

(56) References Cited

U.S. PATENT DOCUMENTS

2012/0258664 A1* 10/2012 Kinneberg ............ H04W 8/005
455/41.2
2014/0359602 A1    12/2014 Sawaya et al.
2016/0294728 A1* 10/2016 Jain ........................ H04L 47/82
2017/0230257 A1*  8/2017 Bruun ................. G06F 9/44505

* cited by examiner

DYNAMIC CREATION OF SUBSERVICES

CROSS-REFERENCES TO RELATED APPLICATIONS

The present application claims the benefit of and priority to U.S. Provisional Application No. 62/171,953, filed Jun. 5, 2015, the entire contents of which is incorporated herein by reference for all purposes.

FIELD

The described embodiments relate generally to the creation of a subservice for an application. More particularly, the exemplary embodiments are related to the dynamic creation of a subservice for an application.

BACKGROUND

User's often have multiple devices, such as a mobile phone, tablet, and smartwatch, which interact with each other in accordance with the needs of the user. For example, a user may have a social media application (e.g. Facebook®, Twitter®, Instagram®) installed on both their smartwatch and their mobile phone so that the user can post comments or pictures on the social media application using both their mobile phone and their smartwatch. Various types of applications can be installed in each of the devices.

In order for devices (e.g. mobile phone and smartwatch) to communicate application information with each other, a communication channel or service can be created between the devices. A communication channel can be a high level communication channel that is used to communicate messages between devices. Such services are static. However, such a restriction limits options for how a client application might want to communicate with another device.

SUMMARY

The exemplary embodiments can provide methods and devices for providing the dynamic creation of a subservice from a template service.

In accordance with an exemplary embodiment, when a client application is first installed onto a device, the client application can select a template service file to define a configuration file specific to the client application for use to create a subservice. The configuration file for the client application can include links to definitions in the template service file, thereby reducing the amount of memory needed to store the configuration file for the client application.

Other embodiments are directed to systems, portable consumer devices, and computer readable media associated with methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

A user of devices (e.g., mobile phones, smartwatch) often wants to install applications (e.g. client applications) on several of their devices. Further, an application is often installed in multiple devices. In order for the devices to communicate with each other, a service or communication channel for the application can be established between the devices.

A service can be defined by a specific set of fixed properties that are stored in a file of the operating system. When the operating system is booted up, each service can be loaded using separate files. A client application that uses the service can create an instance of the service to communicate with another device. An example of a service is an SMS message service, e.g., which uses a connection to a network to send a message in a specified format. Other examples can relate to peer-peer connection, e.g., for Bluetooth communications from a phone to a speaker system. This set of services is typically static. However, such a restriction limits options for how a client application might want to communicate with another device.

In some exemplary embodiments, a subservice can be dynamically created for the client application so that two devices can communicate with each other using the client application. The subservice can be created by using a template service file. The template service file is used to create a subservice configuration file (also called a configuration file) for the client application. Preferences for the client application (e.g., stored in the client application) can be used to create the subservice configuration file based on the preferences. The subservice configuration file can be stored in the device for later retrieval to create instances of the subservice. The subservice configuration file for the client application can include links to property definitions in the template service file.

The subservice can be used by devices (e.g. smartwatch and mobile phone) to communicate with each other regarding a client application (e.g. social media application). If, for example, the smartwatch does not have a subservice for the client application, then a subservice can be dynamically created, e.g., from preferences defined in the client application. Once the subservice is created for the client application, then an instance of the subservice can be used for communications between the smartwatch and mobile phone. Thus, the devices can use the instance of the subservice to share information with respect to, for example, the social media application.

I. Services and Subservices

In some embodiments, a client application can use a service (also called a communication service) of a first device to communicate with another device. The service may comprise one or more system routines of the first device that can be used to communicate with the other device. The device may have multiple services, each corresponding to different communication channels for communicating with another device. The other device may have an application corresponding to the client application of the first device. For example, a first service may exist for communicating mail messages. A second service may exist for communicating calendar events.

A service may be defined by various settings (properties) of one or more transport protocols. A service can be defined by a specific set of properties that are stored in a file of the operating system. In some embodiments, a client application may use only one specific service. In other embodiments, a client application may use different services, with a particular service being used for a particular type of communication to a particular device. Another service might be used for a different type of communication or for a different device.

In some embodiments, a different service file can exist for each service, as a template to create a configuration file for a subservice. When the operating system is booted up, the service file can be loaded. A client application that uses the service can create an instance of the service to communicate with another device. Further, a client application can configure the template service file to create a configuration file for dynamically define a subservice.

Accordingly, a subservice for a client application can be created by using a template service file. A service may include several property definitions that may not be desired or used by the client application. If a service is used that contains all of the property definitions even though they are not needed or desired by the client application, this can result in the use of additional memory and can also delay the booting of the operating system. Therefore, according to an exemplary embodiment a subservice can be created.

Properties of a service file can be modified according to preferences for the client application to create a tailored configuration file. The subservice would include the properties of the service that are desired for the client application. An instance of the subservice can then be used by a device that wants to communicate about the client application with another device. Therefore, less memory and time can be used in establishing a communication channel between devices.

A. Communicating a Service

In order for devices to communicate with each other regarding an application, a service directed to the application can be communicated between the devices. Specifically, a first device can let a second device know whether it has a service directed to a particular application, and the second device can let the first device know whether it has a service directed to a particular application.

Figure 1:
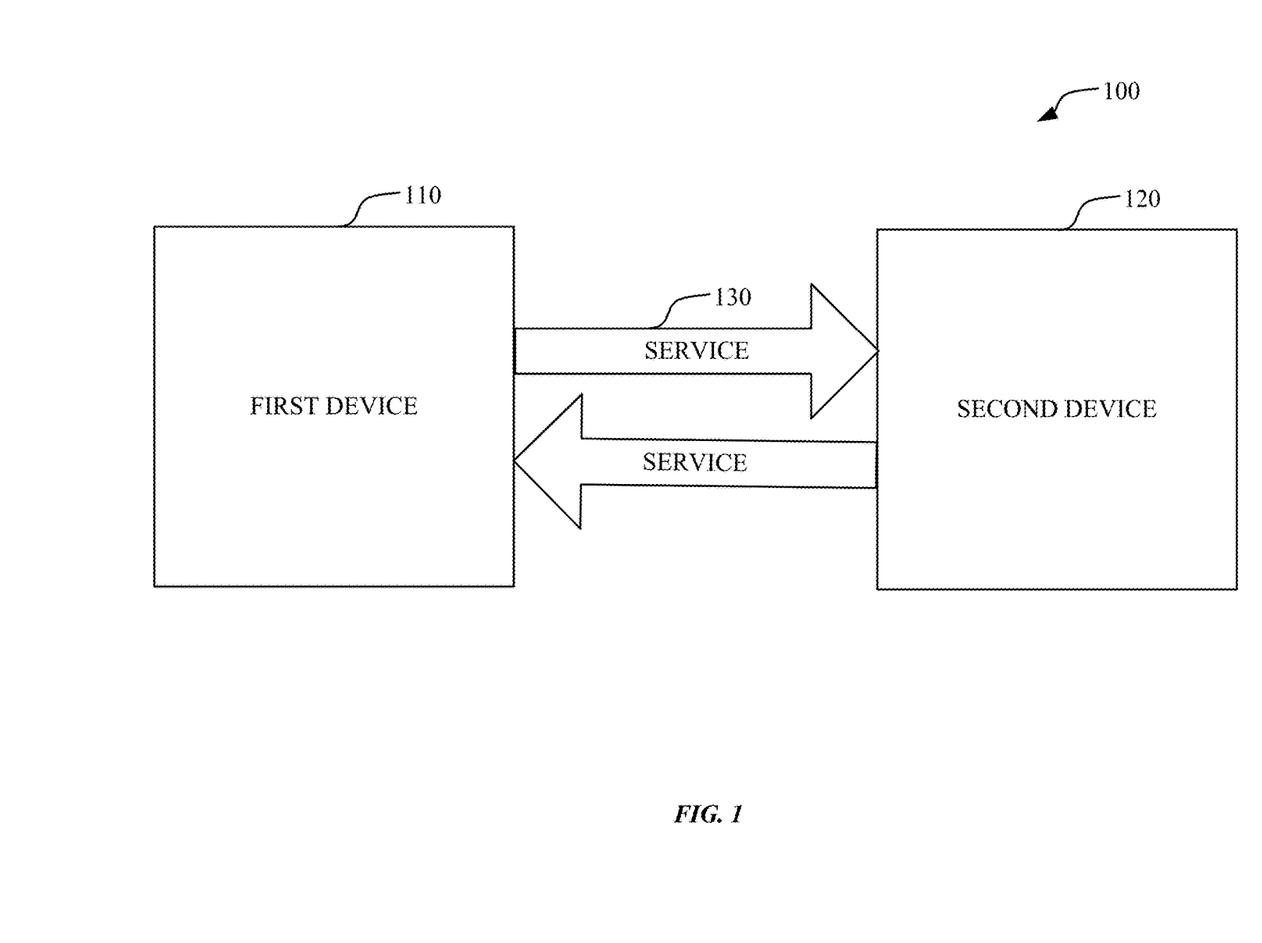
FIG. 1 is a block diagram illustrating a system communicating a service according to an exemplary embodiment.

FIG. 1 is a block diagram illustrating a system communicating a service according to an exemplary embodiment. As shown in FIG. 1, in order for the first device 110 and the second device 120 of the system 100 to communicate with each other with respect to an application, a service 130 for the application can be communicated between the devices. The devices can use the service 130 to send messages, such as messages directed to an application, to each other.

When a first device 110 (e.g. smartwatch) is connected to a second device 120 (e.g. mobile phone), a handshake can occur between the devices, where the handshake includes information from each of the devices (e.g. protocol information). If there is service information for an application, then service 130 is shared between the devices. Compatibility of a service between devices can be determined during the handshake. Further, a service can be based on a particular version of an application. If the devices have compatible services (or subservices) for the application, then the devices can communicate with each other.

For example, if a user has a social media application installed on the first device 110 (e.g. smartwatch) and the second device 120 (e.g. mobile phone), the first device 110 and the second device 120 can communicate their service information with each other. If the first device 110 and the second device 120 have a compatible service for the social media application, then interoperability is established with the devices. Specifically, communication between the first device 110 and the second device 120 is performed so that information that is entered in the social media application can be controlled or entered by either the first device 110 (e.g. smartwatch) or the second device 120 (e.g. mobile phone).

A service can be used for devices to communicate with respect to, for example, a mail application, a calendar application or a social networking application. There could be a separate for a mail application, a calendar application, or a social networking application. These are only examples and various services can be used in order for devices to communicate with respect to different applications.

When a service acts as a parent service, a client application can use a template service file of the parent service. The template service file can include several properties (e.g. property definitions) that are preset (i.e. baked) into the operating system. However, some of the properties may not be needed by a client application.

In accordance with an exemplary embodiment, properties of the configuration file from the parent service can be modified as desired by the user of the client application to create a subservice. The subservice would be created from a template service file from the parent service. Therefore, the subservice can be customized for the client application.

B. Communication Interface

A link or a series of links can be used to communicate a service or subservice between devices. In an exemplary embodiment, multiplexing can be performed over a link or over a series of links that contain the service or subservice information.

Figure 2:
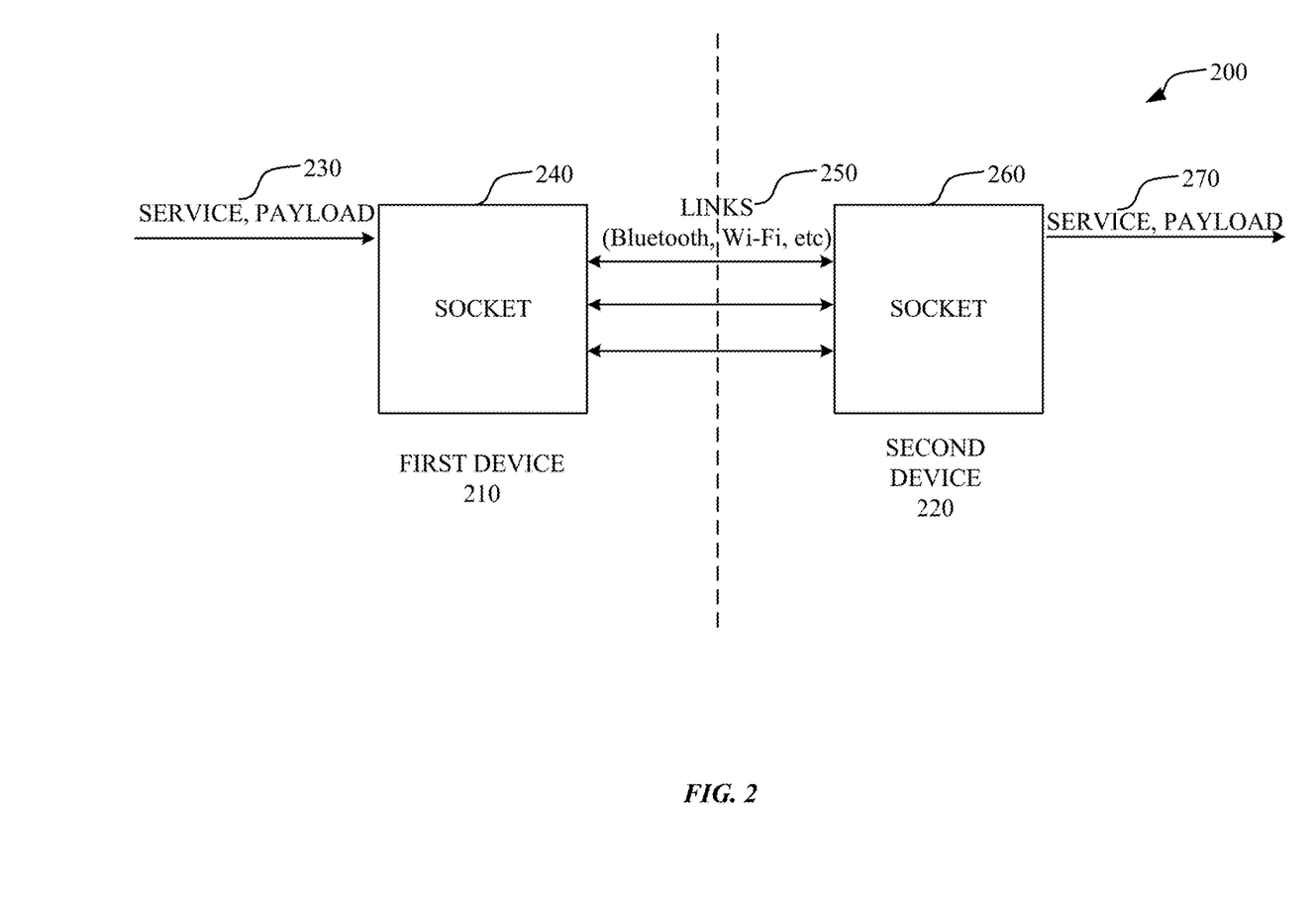
FIG. 2 is a block diagram illustrating a system of multiplexing service information according to an exemplary embodiment.

FIG. 2 is a block diagram illustrating a system of multiplexing service information according to an exemplary embodiment.

As shown in FIG. 2, a system 200 for performing multiplexing includes a socket 240 of a first device 210 and a socket 260 of a second device 220. Multiplexing can be performed over a single link or a set of links 250. Links can include, for example, a Wi-Fi link and a Bluetooth link. A link of links 250 is chosen in order to communicate a particular service to another device. The link is used to communicate the service information of, for example, second device 220 to first device 210.

Information such as service information and payload information 230 can be written into and read out of, for example, socket 240. A message can be tagged with a service and the payload information such that service and payload information 270 is then received on the second device 220. Therefore, when the service information of the second device 220 is sent to the first device 210, the first device 210 can identify the service being used by the second device 220. The first device 210 can receive, for example, the name of the service (e.g. the name of the application that the service is directed to) that is used by the second device 220. The first device 210 can then use the service information that was provided by the second device 220 to determine whether the first device 210 has the corresponding application.

II. Dynamically Creating a Subservice

Embodiments provide the dynamic creation of a subservice for a client application based on a service from a parent service. Therefore, the properties of the service can be customized to the client application.

Figure 3:
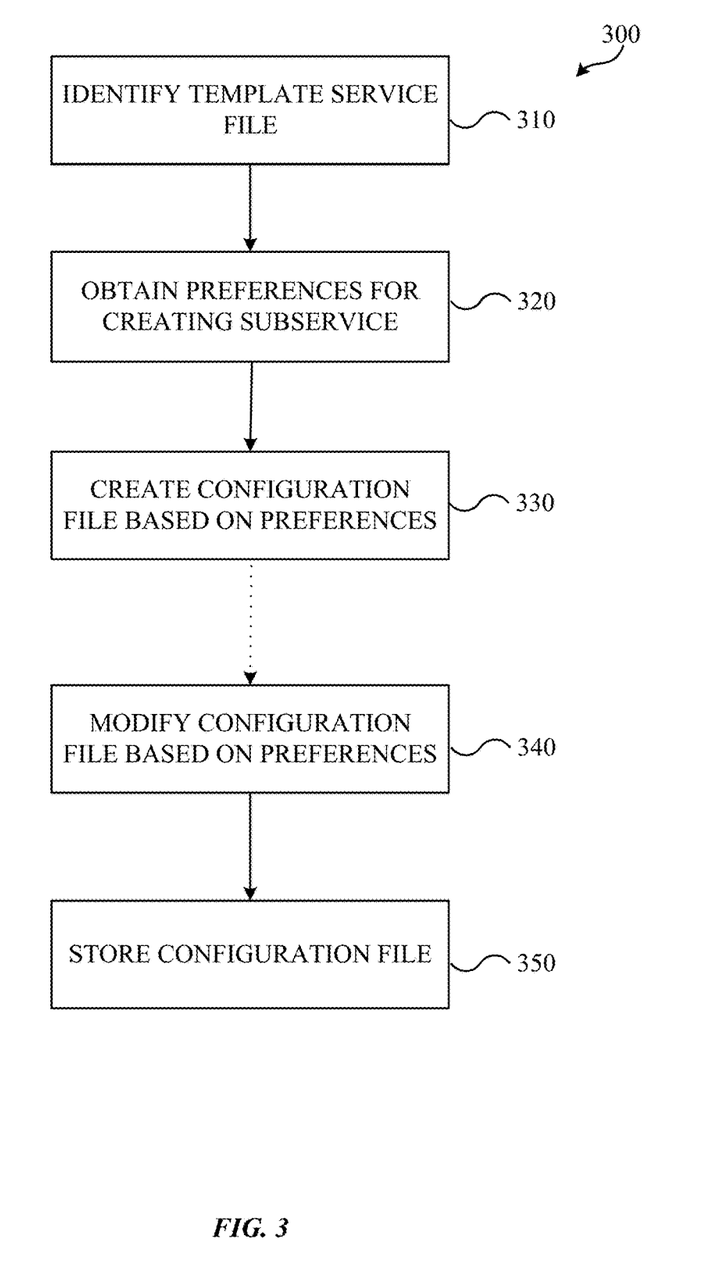
FIG. 3 is a flowchart of a method for creating a dynamic subservice according to an exemplary embodiment.

FIG. 3 is a flowchart of a method for creating a dynamic subservice according to an exemplary embodiment. Method 300 as shown in FIG. 3 can be performed by a device (e.g., a mobile device, such as a smartwatch, mobile phone, laptop, or tablet).

At step 310, a template service file is identified from a parent service. A template service file includes property definitions for creating a subservice that will be used as a communication channel between devices.

When a client application is first installed onto a device, if there is no subservice for the application installed in the operating system of the device, then a subservice configuration file can be created for the client application. Specifically, the client application selects a template service file for the parent service. The template service file includes one or more property definitions for configuring a service file. A template service file could correspond to each type of application.

However, certain properties which are included in the template service file may not be desired or additional properties may be desired by the client application. Therefore, the template can be used to define a configuration file specific to the client application. That is, a subservice configuration file would be created for the client application using the template. Although one template service file for an application is described, there can be various template service files for an application and a client application can use multiple services.

As an example, a mobile phone (e.g. iPhone) can have a template service file for communicating with a smartwatch (e.g. Apple watch). A client application (e.g. a social media application) that has an extension for the smartwatch can use the smartwatch template service file to customize a configuration file for the client application to communicate with the watch. The client application would then use the customized configuration file for creating an instance of the service. Therefore, if the application that is to be installed in a device is a social media application, then a template service file for the social media application can be used to communicate between the mobile phone and the smartwatch.

At step 320, property definition preferences for the client application are obtained. Specifically, one or more preferences for creating a subservice is obtained from the client application. The preferences can include specific properties which are desired for the client application. The preferences can be selected using an application programming interface (API) for the application.

A property specific to the client application can be a name of the application. That is, the subservice for the client application can include the name of the application. Therefore, the subservice can be more easily identified since the subservice is named according to a particular application, as opposed to a general default name for all services.

Although a name is used as an example, other properties can be used. For example, the client application can customize a type of network connection (e.g., local or wide network), availability to use a phone network, availability to use a specific server, and power management for its subservice configuration file.

For example, if the application being installed is a social media application, then the property definitions that are to be included in the configuration file for the subservice (i.e. service for the client application) are based on the social media application. The subservice information (e.g., containing preferences for the configuration file) can contain name information which is directed to social media application. Therefore, since the subservice is now specific to the social media application, when the subservice is being used, it is clear that that the service is for a social media application. By being able to customize, for example, the name of the application, it can be easily and quickly determined whether a service supports an application or can be used to communicate about an application.

At step 330, a subservice configuration file is created based on the preferences obtained for the client application. The template service file from the parent service is used to create a configuration file for the client application (e.g. subservice configuration file). The subservice configuration file can include one or more property definitions from the template service file which was obtained from the parent service.

Specifically, a daemon directed to applications for the device (e.g. a smartwatch application daemon) can determine whether a subservice configuration file exists. If the subservice configuration file for the application does not exist for the device, then the application daemon can generate the subservice configuration file. If the subservice configuration file for the application already exists, then the application daemon can determine whether to use the subservice configuration file that already exists or if the existing subservice configuration file should be removed. The generation of the subservice configuration file will be explained in more detail with respect to FIGS. 4 and 5.

The daemon which is directed to applications for the device (e.g. a smartwatch application daemon) can create the subservice configuration file according to the preferences which were selected for the client application. For example, the subservice configuration file can be initially generated with default service properties according to a type of application and/or device. The daemon can modify the default properties if they are not the properties desired for the client application. Also, the daemon can remove any of the default properties which are not consistent with the preferences for the client application. Alternatively, instead of using default properties, the daemon can actively select the properties desired for the client application according to the preferences for the client application. Therefore, a subservice configuration file is created for the client application.

At step 340, as an optional step, after the configuration file has been created according to the preferences for the client application, the configuration file can be modified. The configuration file can be modified according to the preferences that were obtained for the client application at step 320. The daemon that is directed to applications for the device (e.g. a smartwatch application daemon) can modify the subservice configuration file according to the preferences which were selected for the client application.

The use of the template file can make it easier for a client application to modify the property definitions. By using a template file, the properties which are desired for the client application can be selected and properties which are not desired by the client application will not be selected. The selection of properties of the template file can be performed using an API. Through the API, available properties can be provided and a user of the client application can select which of the properties they would like included for the subservice. Default properties or suggested properties can also be provided according to the type of application or device. The default properties can be modified as needed for the client application. Therefore, the template can guide the user in selecting and modifying property definitions for the client application.

At step 350, the subservice configuration file is stored in a memory of the device. Specifically, the subservice configuration file which has been customized for the client application is stored in the client device. The subservice configuration file for the client application can include links to property definitions from the template service file. Since links to the property definitions are used instead of the entire content of the property definitions, the amount of memory which is needed to store the subservice configuration file can be reduced.

According to the exemplary embodiments, a service that is specific to a client application can be easily created since properties are obtained from a template service file and the properties of the service can be customized according to the client application.

III. Communication Using Subservice

If a subservice for a client application has been created, then devices can use the subservice to communicate with each other regarding the client application. The devices can share control information or application content through the subservice. Therefore, if a user uses multiple devices to post content on a social media application (or other application), the content that appears on, for example, a smart watch will be consistent with the information that appears on, for example, a mobile phone.

Figure 4:
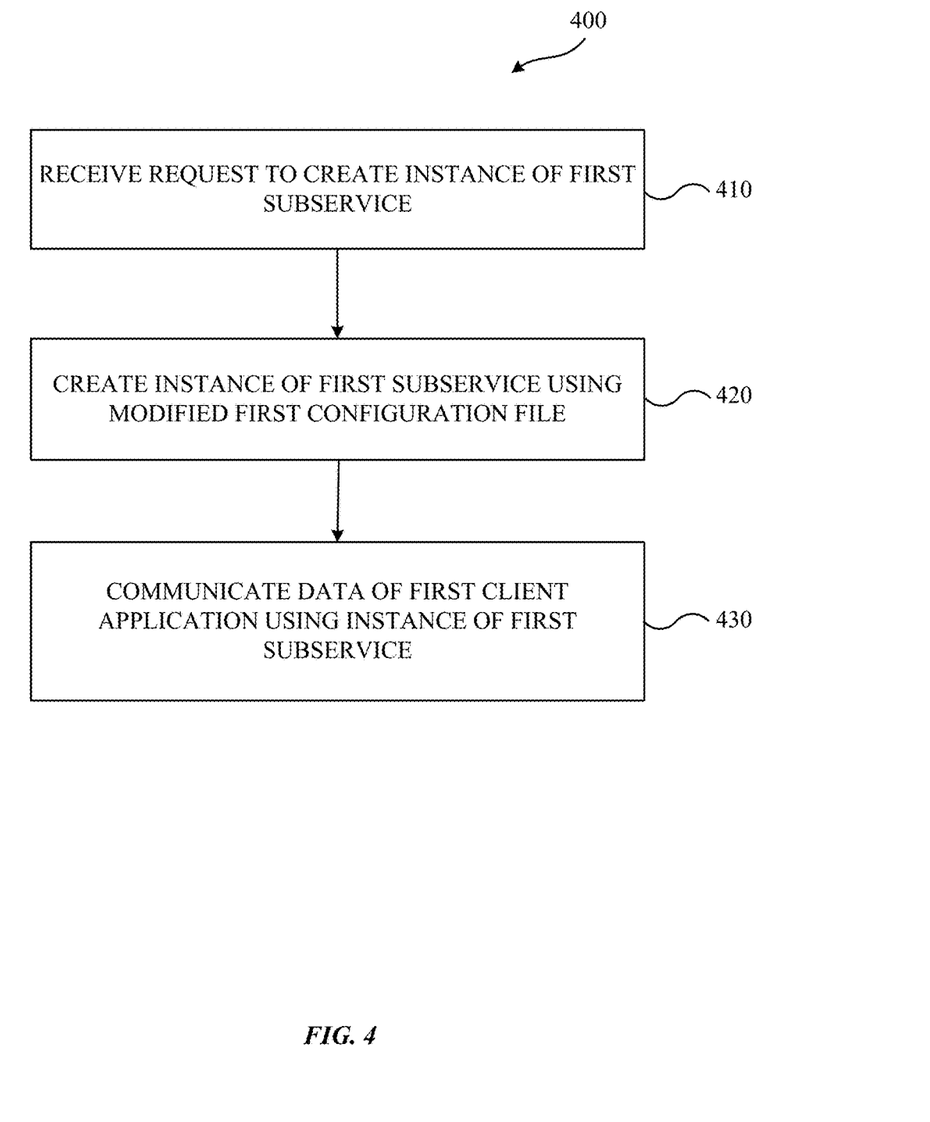
FIG. 4 is a flowchart of a method for performing communication between devices using a subservice according to an exemplary embodiment.

FIG. 4 is a flowchart of a method for performing communication between devices using a subservice according to an exemplary embodiment. Method 400 as shown in FIG. 4 can be performed by a device (e.g., a mobile device, such as a smartwatch, mobile phone, laptop, tablet, or desktop computer). As shown in FIG. 4, the subservice configuration file that was created in, for example, FIG. 3, can be used by devices to communicate about an application.

At step 410, if devices would like to communicate about an application, a client application in a first device can generate a request to create an instance of the subservice. The subservice is used for the first device to communicate with a second device.

For example, if a user would like to use both a smartwatch (e.g. Apple watch) and a mobile phone (e.g. iPhone) to post comments on an application, the smartwatch, for example, can generate a request to create an instance of the subservice for the application. That is, a smartwatch application daemon of the smartwatch can create a request to create an instance of the subservice.

At step 420, the subservice configuration file is used to create an instance of the subservice. A smartwatch application daemon can determine whether a subservice for the application exists. The subservice has been customized for the client application using the subservice configuration file. If the subservice exists, then it will be identified and used for communication between devices.

At step 430, communication about an application is performed between a first device and a second device using the subservice. Specifically, the smartwatch and a mobile phone can communicate with each other with respect to an application. The subservice configuration file is used to create a subservice which is used as a communication channel between devices. Specifically, a request for a service that is directed to the application can be sent to an application daemon of the smartwatch. If an application subservice exists for the application, then an instance of the application subservice is created for communication between the mobile phone and smartwatch.

Therefore, communication between devices can be quickly performed since a subservice directed to a particular application can be quickly identified and used by the devices. Further, it can be immediately determined whether a subservice for an application does not exist and therefore, whether a subservice needs to be created or communication between the devices cannot be performed at that time.

IV. Devices Dynamically Creating and Using Subservice

A client application can use a parent service in order to create a subservice for the client application. The subservice can be dynamically created by using a template service file obtained from the parent service. The template service file can be configured for the client application in order to dynamically create a subservice, and the subservice can then be used by devices to communicate regarding an application.

Figure 5:
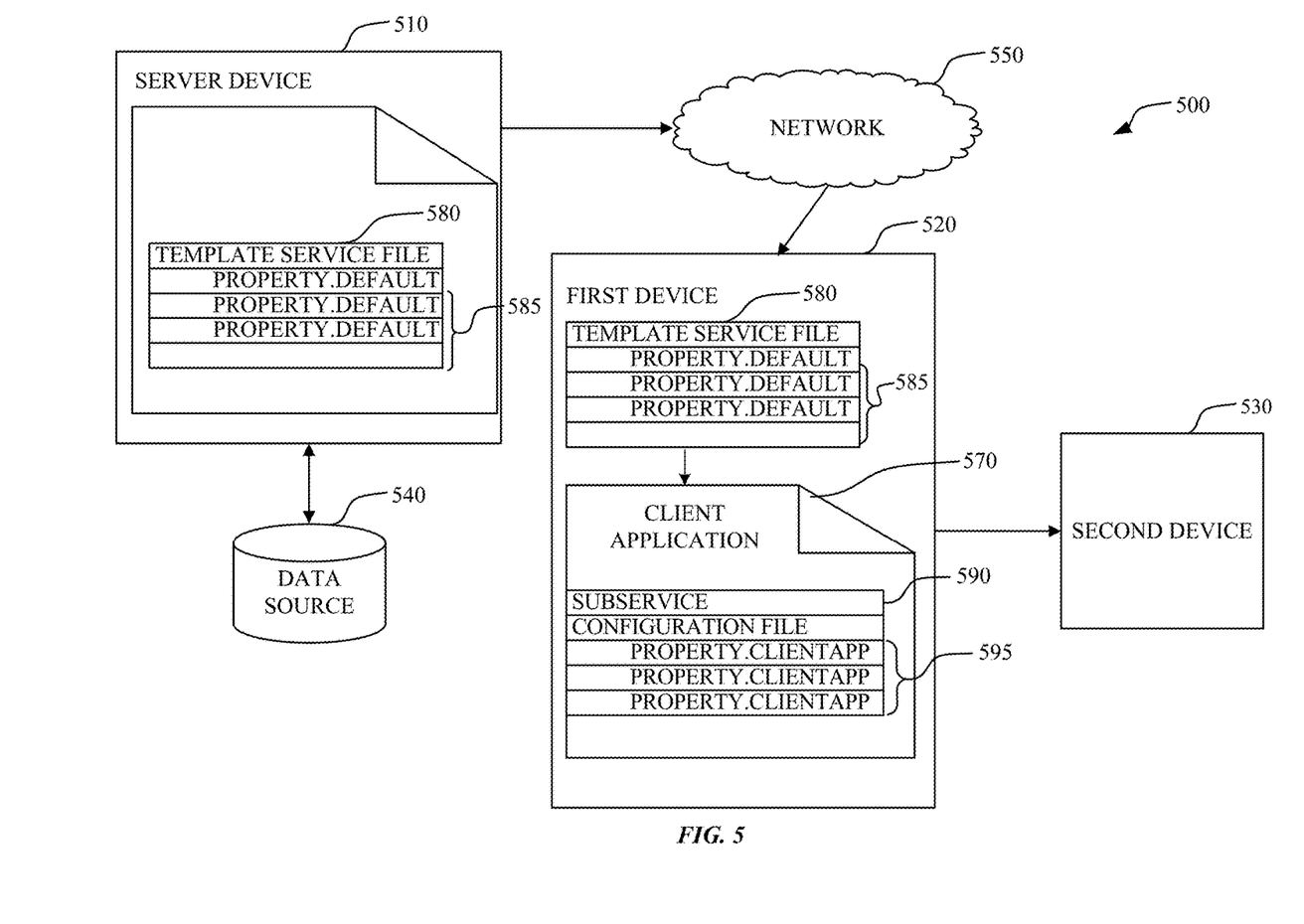
FIG. 5 is a block diagram illustrating a system for the dynamic creation and use of a subservice according to an exemplary embodiment.

FIG. 5 is a block diagram illustrating a system for the dynamic creation and use of a subservice according to an exemplary embodiment.

As shown in FIG. 5, the system 500 includes a first device 520 (e.g. mobile phone, smartwatch). The first device 520 can include a template service file 580. The template service file 580 can include one or more property definitions 585 for configuring a service. A service file of a parent service may include one or more property definitions that are not needed by a client application 570. If the first device 520 (e.g. smartwatch, mobile phone) does not need all of the property definitions that are included in template service file 580 of the parent service, the first device 520 can use the template service file 580 to create a subservice customized for the client application. Specifically, the template service file 580 can be used to create a subservice configuration file 590 that includes property definitions customized for a client application 570.

By using the template service file 580, property definitions that are desired for the client application 570 can be selected and property definitions that are not desired by the client application 570 will not be selected. The property definitions 595 in the subservice configuration file 590 are based on preferences for the client application. The selection of property definitions of the template service file 580 can be performed using an API. Through the API, available property definitions can be provided and a user of the client application can select the property definitions they would like included for the subservice.

The property definitions 595 can be customized according to a type of the client application 570 or a type of first device 520 on which the client application is being installed. Default property definitions or suggested property definitions can also be provided according to the type of application or device. The default property definitions can be modified as needed for the client application. The template can guide the user in selecting property definitions for the client application.

The operating system (OS) of the first device 520 includes the template service file 580. When a client application 570 is installed in the first device 520, the template service file 580 is used to create a subservice configuration file 590 for the client application 570. Specifically, the template service file 580, which is associated with the client application, is identified and is used to create a subservice configuration file 590. The subservice configuration file 590 can then be used to create an instance of a subservice for the client application. When the operating system of the first device 520 boots up, the subservice configuration file 590 is read and an instance of the subservice is created.

An OS including a template service file can be initially obtained from server device 510 that contains information for configuring a service of an application. The information can be stored in, for example, a data source 540 and the information can be retrieved by the server device 510. Further, communication between the devices can be performed over a network 550. Additionally, the subservice configuration file 590 can be modified according to the client application preferences.

After a subservice configuration file for the first device 520 has been configured, the subservice configuration file 590 can be used to create an instance of a subservice for the client application. The first device 520 can then communicate with a second device 530 (e.g. smartwatch, mobile phone) using the instance of the subservice. Specifically, when the first device 520 indicates that it would like to communicate with the second device 530 with respect to an application, the first device 520 uses the subservice configuration file 590 to create an instance of the subservice. The instance of the subservice is then used to send messages regarding the subservice between the first device 520 and the second device 530.

Therefore, the first device 520 can use the template service file 580 to create a subservice configuration file 590 that corresponds specifically to the client application 570. The subservice configuration file 590 can be stored in a memory of the first device 520. Although one template service file for an application is described, there can be various template service files for an application and a client application can use one or more template service files.

V. Creation and Communication of Subservice on Daemon

In order to determine whether devices can communicate with each other with respect to an application, the service information of each of the devices is shared between the devices. Various mechanisms can exist on the devices in order to control how and when a message containing an identifier for the subservice is provided between the devices.

Figure 6:
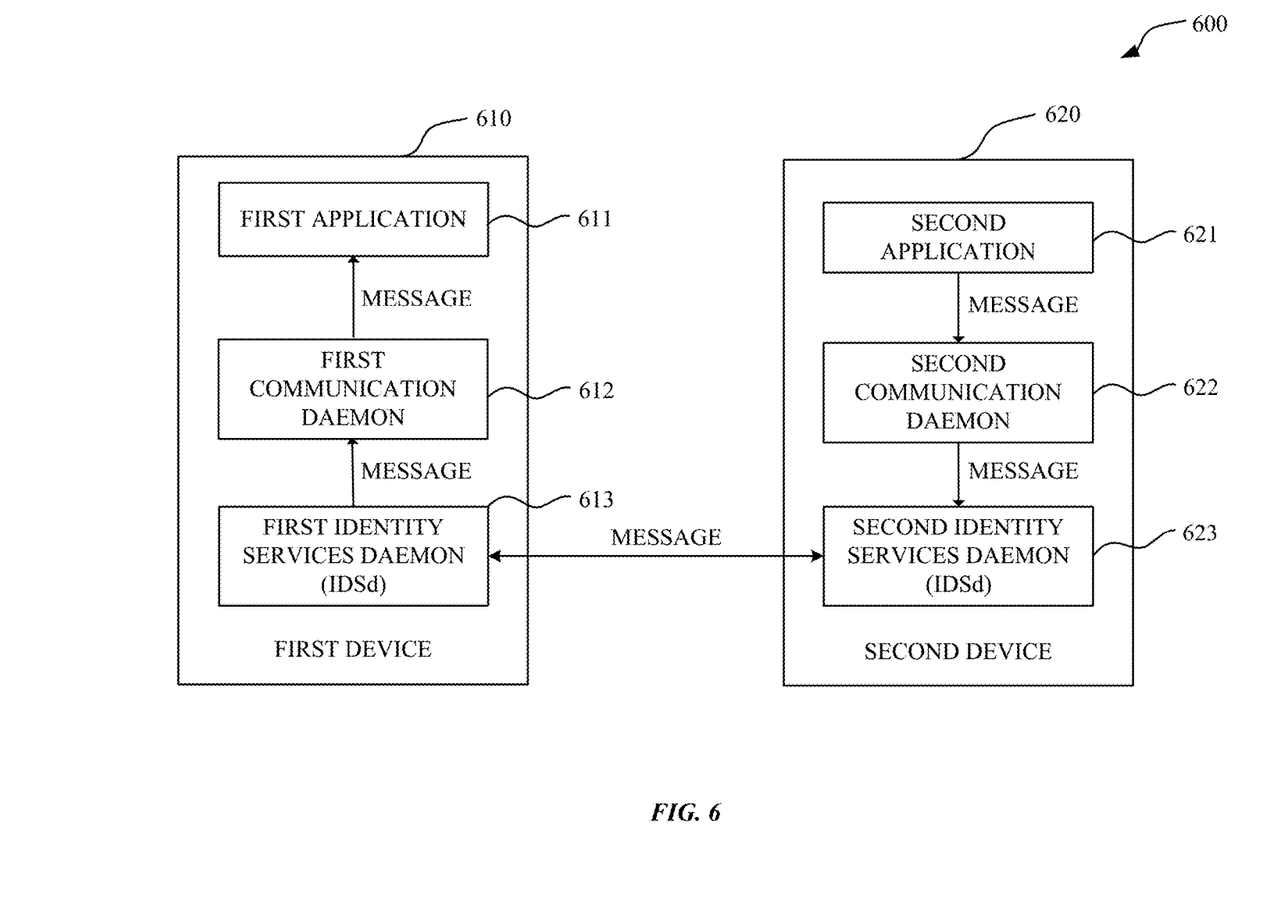
FIG. 6 is a block diagram illustrating a system for communicating a subservice between devices according to an exemplary embodiment.

FIG. 6 is a block diagram illustrating a system for communicating a subservice between devices according to an exemplary embodiment.

As shown in FIG. 6, the system 600 includes a first device 610 (e.g. a mobile phone) that includes a first application 611, a first communication daemon 612, and a first identity services daemon (IDSd) 613, which is a transport daemon. The system can also include a second device 620 (e.g. a smartwatch) that includes a second application 621, a second communication daemon 622, and a second identity services daemon (IDSd) 623, which is a transport daemon. The communication daemons 612 and 622 are daemons for programming applications on a device. Communication daemons 612 and 622 can be watch communication daemons. The communications daemons 612 and 622 can operate to provide connectivity between the devices. First communication daemon 612 and second communication daemon 622 can be directed to for example, programming instructions sets which can be used to program the devices. Also, although two devices are illustrated, the system can include several devices.

First application 611 and second application 621 can include software components devices. In addition, first application 611 and second application 621 can include an application extension. The application extension can be used for communications between first application 611 and second application 621 in first device 610 and second device 620, respectively. These software components can execute independently or together. In other embodiments, the software components can be downloaded separately to the two devices.

First communication daemon 612 and second communication daemon 622 can determine how communications are to occur with the devices. First communication daemon 612 and second communication daemon 622 can determine a particular manner for sending any data (e.g., service information) from applications in the devices. First communication daemon 612 and second communication daemon 622 can perform background processes for sending data (e.g., files) according to specified rules, e.g., send data for a specified amount of time, and when not finished then pause (e.g., so that other data can be sent). First communication daemon 612 and second communication daemon 622 can also process any data such that the data is in a format that can be determined by the first device 610 and the second device 620. First communication daemon 612 and second communication daemon 622 can also translate data received from the devices into a format that is readable by the applications.

First IDSd 613 and second IDSd 623 (e.g. transport daemons) can communicate data sent to/from each other. Further, first IDSd 613 and second IDSd 623 can store subservice configuration files for applications in the first device 610 and the second device 620, respectively.

A. Creating the Subservice in the Device

When an application is loaded on, for example, the first device 610, the first communication daemon 612 determines whether a subservice exists for the application. If a subservice exists for the application, then first communication daemon 612 routes the subservice to the application. If a subservice does not exist for the application, then the first communication daemon 612 is used to create a subservice for the application.

The first application 611 communicates with the operating system of the first device 610 and the first communication daemon 612 would create the subservice with respect to first application 611. Specifically, first communication daemon 612 is responsible for managing the applications which are installed. First communication daemon 612 monitors the applications which are being installed or deleted and would determine whether a subservice should be created or removed. First communication daemon 612 can communicate through an API as to which subservices should be created or removed.

After a subservice has been created, it is stored in the first IDSd 613 or transport daemon. The subservices are stored as part of the transport daemon associated with the top level service (parent service).

B. Performing Communication Between Devices Using Subservice

When the second device 620 sends a message including its subservice for an application to the first device 610, the first device 610 determines whether the subservice exists for the first device. Specifically, the second application 621 in the second device 620 sends a message including its subservice to second communication daemon 622 which sends the message to the second IDSd 623. The second IDSd 623 of the second device then sends the message, including the service information, to the first device 610.

The second IDSd 623 of the first device 610 receives the message from the second IDSd 623 of the second device 620. The first IDSd 613 and the second IDSd 623 can store the subservices for the respective devices. Specifically, the first IDSd 613 and the second IDSd 623 store the subservice configuration files for later use by the client applications.

If a subservice is identified in the first IDSd 613, then the first communication daemon 612 is used for routing the subservice and the first communication daemon 612 does not need to create a subservice. Specifically, if the subservice received by the first IDSd 613 is a watch programming subservice (e.g. WatchKit subservice), then the first IDSd 613 launches the first communication daemon 612 and gives the first communication daemon 612 the message.

The first communication daemon 612 identifies the subservice and routes the subservice to first application 611. The first communication daemon 612 can determine which subservice the message is directed to, based on the preferences (e.g. name of application) which were identified for the application, and can then route the message to the first application 611.

For example, if a subservice is named "XYZ," the first communication daemon 612 would determine that the message is for the "XYZ" application and would hand the message to the XYZ application. Specifically, the first communication daemon 612 can determine which subservice the message is directed to and can then route the message to the first application 611 which is installed based on the name of the subservice. Therefore, the first communication daemon 612 can quickly determine that the service exists because the name of the application can be easily identified.

A customized subservice configuration file can be used by daemons on both devices (e.g. first communication daemon 612 and second communication daemon 622) to determine whether corresponding services are available for communicating certain data between client applications on the two devices. A customized name can be used to facilitate the identification of the service, and can be used to determine how to route data to the corresponding client application on the other device. The name can also be used to quickly identify which configuration files to delete when a client application is uninstalled.

Since the subservices are stored in a transport daemon (e.g. IDSd), the transport daemon can listen for messages without requiring the communication daemon to be active and running. Once the subservices are created, the subservices can be booted up with the operating system. If a subservice does not exist, then a parent service of the application can be used instead until a subservice is created specifically for that application.

If a service for an application is not in a device, it can be quickly determined that devices cannot communicate about an application and communication cannot proceed. Any messages directed to that application can be deleted.

Therefore, a subservice which is customized for a client application is created and communication between devices regarding an application can be performed using a subservice which can be easily identifiable.

Although the exemplary embodiment has been discussed with respect to the second device 520 initiating communication with first device 520, this is merely an example. Either device can initiate the communication.

VI. Example Device

Figure 7:
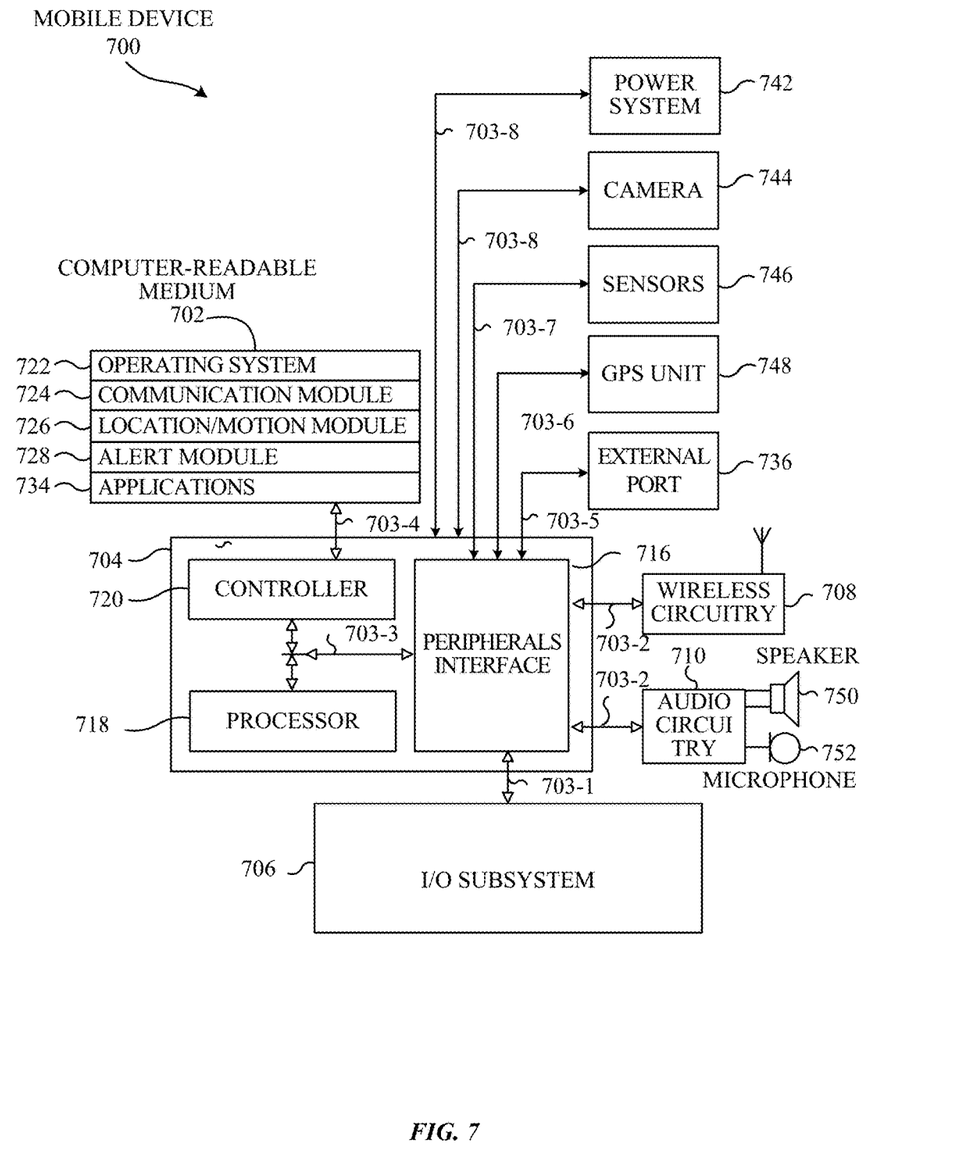
FIG. 7 is a block diagram of an example device according to an exemplary embodiment.

FIG. 7 is a block diagram of an example device according to an exemplary embodiment. Specifically, FIG. 7 is a block diagram of an example device 700, which may be a mobile device such as a mobile phone or a smartwatch. Device 700 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, an services module 728, and other applications (or set of instructions) 734, such as a car locator app and a navigation app. Services module 728 can create dynamic subservices as described herein.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

Alert module 728 (or alert system) can include various sub-modules or systems, e.g., as described above in FIG. 3.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computer-implemented method for enabling communication of a client application of a first computing device with a second computing device, the method comprising, at the first computing device:

determining, by a daemon in communication with a first client application for the first computing device, whether a first subservice for enabling communication between the first computing device and the second computing device is to be created, wherein the determining comprises identifying, by the first computing device, a first service for the first client application on the first computing device that is compatible between the first computing device and the second computing device;

in response to determining that the first subservice is to be created, identifying a template service file of the first service associated with the first client application on the first computing device, wherein the template service file includes property definitions for creating subservices of the first service that communicate with the second computing device;

obtaining, from the first client application, one or more preferences for the first client application in order to dynamically create the first subservice for communicating with the second computing device, wherein the one or more preferences include properties for the first client application;

using, by the daemon, the template service file of the first service to create a first subservice configuration file corresponding to the first client application based on the one or more preferences, wherein creating the first subservice configuration file comprises including a plurality of the property definitions of the template service file of the first service in the first subservice configuration file;

storing the first subservice configuration file in a memory of the first computing device;

receiving, by the daemon, a request from the first client application on the first computing device to create a first instance of the first subservice for communicating with the second computing device;

using the first subservice configuration file to create the first instance of the first subservice for communicating data with the second computing device; and communicating the data of the first client application with the second computing device using the first instance of the first sub service.

2. The method of claim 1, wherein the template service file associated with the first client application on the first computing device is identified during a configuration of the first client application when the first client application is initially installed in the first computing device.

3. The method of claim 1, further comprising, at the first computing device:

modifying at least one of the plurality of the property definitions using the one or more preferences.

4. The method of claim 1, wherein communicating data of the first client application with the second computing device includes:

determining, by a first computing device communication daemon, whether the first instance of the first subservice is the same as a second instance of a second subservice of the second computing device; and in response to the first instance of the first subservice being the same as the second instance of the second subservice, sending, by the first computing device communication daemon, the data of the first client application to the second computing device.

5. The method according to claim 1, wherein the template service file comprises one of a plurality of selectable property definitions and a group of suggested property definitions of according to a first type of the client application and a second type of the first computing device.

6. The method according to claim 1, wherein the one or more preferences for modifying the at least one of the plurality of the property definitions comprise at least one of: a name of the first client application, a type of network connection, a first availability to use a phone network, a second availability to use a specific server, and power management for the first subservice configuration file.

7. The method according to claim 1, wherein the first subservice configuration file used to create the first instance of the first subservice comprises links to the property definitions from the template service file.

8. The method according to claim 1, further comprising, at the first computing device:
creating a plurality of subservices from the template service file, wherein each of the plurality of subservices use preferences for a plurality of different client applications.

9. The method according to claim 1, further comprising, at the first computing device:
receiving the one or more preferences from the client application using an application programming interface (API).

10. The method according to claim 1, wherein the first subservice comprises a communication channel configured for communicating first client application information between the first computing device and the second computing device.

11. The method according to claim 1, wherein the first subservice is a subservice of a first service and wherein the first subservice comprises one or more property definitions of the first service that are modified in accordance with one or more preferences for the first client application.

12. The method according to claim 1, wherein the determining whether the first subservice for enabling communication between the first computing device and the second computing device is to be created, further comprises:
establishing a handshake connection with the second computing device;
receiving service information for the first client application from the second computing device; and
determining whether the service information of the first computing device of the second computing device is compatible with the service of the first computing device.

13. The method according to claim 1, wherein the first computing device comprises a first processor and a first memory, and wherein the second computing device comprises a second processor and a second memory.

14. A computer program product comprising a non-transitory computer readable medium storing a plurality of instructions that when executed control a computer system to enable communication of a client application of a first computing device with a second computing device, the instructions comprising:

determining, by a daemon in communication with a first client application for the first computing device, whether a first subservice for enabling communication between the first computing device and the second computing device is to be created, wherein the determining comprises identifying, by the first computing device, a first service for a first client application on the first computing device that is compatible between the first computing device and the second computing device;

in response to determining that the first subservice is to be created, identifying a template service file of the first service associated with the first client application on the first computing device, wherein the template service file includes property definitions for creating subservices of the first service that communicate with the second computing device;

obtaining, from the first client application, one or more preferences for the first client application in order to dynamically create a first subservice for communicating with the second computing device, wherein the one or more preferences include properties for the first client application;

using, by the daemon, the template service file of the first service to create a first subservice configuration file corresponding to the first client application, wherein creating the first subservice configuration file comprises including a plurality of the property definitions of the template service file of the first service in the first subservice configuration file;

modifying at least one of the plurality of the property definitions using the one or more preferences to create a modified first subservice configuration file;

storing the modified first subservice configuration file in a memory of the first computing device;

receiving a request from the first client application on the first computing device to create a first instance of the first subservice for communicating with a second computing device;

using the modified first subservice configuration file to create the first instance of the first subservice for communicating data with the second computing device; and communicating data of the first client application with the second computing device using the first instance of the first sub service.

15. The computer program product of claim 14, wherein the template service file associated with the first client application on the first computing device is identified during a configuration of the first client application when the first client application is initially installed in the first computing device.

16. The computer program product of claim 14, wherein the instructions further comprise:
modifying at least one of the plurality of the property definitions using the one or more preferences.

17. The computer program product of claim 14, wherein communicating data of the first client application with the second computing device includes:
determining, by a first computing device communication daemon, whether the first instance of the first sub service is the same as a second instance of a second sub service of the second computing device; and in response to the first instance of the first sub service being the same as the second instance of the second subservice, sending, by the first computing device communication daemon, the data of the first client application to the second computing device.

18. The computer program product of claim 14, wherein the template service file comprises one of a plurality of selectable property definitions and a group of suggested property definitions according to a first type of the client application and a second type of the first computing device.

19. The computer program product of claim 14, wherein the modified first subservice configuration file used to create the first instance of the first subservice comprises links to the property definitions from the template service file.

20. The computer program product of claim 14, further comprising, at the first computing device:
creating a plurality of subservices from the template service file, wherein each of the plurality of subservices use preferences for a plurality of different client applications.

21. A first computing device comprising:
one or more processors coupled with a memory, the one or more processors configured to:
determine, by a daemon in communication with a first client application for the first computing device, whether a first subservice for enabling communication between the first computing device and a second computing device is to be created, wherein the determining comprises identifying, by the first computing device, a first service for the first client application on the first computing device that is compatible between the first computing device and the second computing device;
in response to determining that the first subservice is to be created, identify a template service file of the first service associated with the first client application on the first computing device, wherein the template service file includes property definitions for creating subservices of the first service that communicate with a second computing device;
obtain, from the first client application, one or more preferences for the first client application in order to dynamically create a first subservice for communicating with the second computing device, wherein the one or more preferences include properties for the first client application;
use, by the daemon, the template service file of the first service to create a first subservice configuration file corresponding to the first client application, wherein creating the first subservice configuration file comprises including a plurality of the property definitions of the template service file for communicating data with the second computing device of the first service in the first subservice configuration file;
modify at least one of the plurality of the property definitions using the one or more preferences to create a modified first subservice configuration file;
store the modified first subservice configuration file in a memory of the first computing device;
receive a request from the first client application to create an instance of the first subservice for communicating with the second computing device;
use the modified first subservice configuration file to create the instance of the first subservice; and
communicate data of the first client application with the second computing device using the instance of the first subservice.

22. The first computing device according to claim 17, wherein the memory is configured to store:
a smartwatch application daemon executing on the one or more processors and configured to create or remove the first subservice; and
a transport daemon executing on the one or more processors and configured to store a plurality of subservices for the smartwatch application daemon.

23. The first computing device according to claim 21, wherein the memory is configured to store links to the property definitions from the template service file for the modified first subservice configuration file.

24. The first computing device according to claim 21, further comprising an application programming interface (API) provided by a communication daemon stored in the memory, the API configured to be used to select at least one of the property definitions for the modified first subservice configuration file.

* * * * *

UNITED STATES PATENT AND TRADEMARK OFFICE
CERTIFICATE OF CORRECTION

PATENT NO. : 10,348,857 B2
APPLICATION NO. : 14/872103
DATED : July 9, 2019
INVENTOR(S) : Pierre J. De Filippis and Daniel B. Pollack Page 1 of 1

It is certified that error appears in the above-identified patent and that said Letters Patent is hereby corrected as shown below:

On the Title Page

Item [57], should read:
Methods and devices for enabling communication of a client application of a computing device when other devices are provided. The method includes obtaining, from a first client application on the computing device, one or more preferences for creating a first subservice for communicating with the other devices. A template service file associated with the first client application is identified and the template service file includes property definitions for creating subservices that communicate with the other devices. The template service file is used to create a first configuration file corresponding to the first client application, the first configuration file including a plurality of the property definitions of the template service file. At least one of the plurality of the property definitions is modified using the one or more preferences. The first configuration file is stored in a memory of the computing device.

In the Claims

Claim 1, Line 53, Column 16, delete "sub service" and insert --subservice--.

Claim 14, Line 47, Column 18, delete "sub service" and insert --subservice--.

Claim 17, Line 62-63, 63-64 and 65, Column 18, delete "sub service" and insert --subservice--.

Signed and Sealed this
Twenty-ninth Day of October, 2019

Andrei Iancu
*Director of the United States Patent and Trademark Office*